United States Patent [19]

Andrews

[11] Patent Number: 5,161,975

[45] Date of Patent: Nov. 10, 1992

[54] BRAILLE TEACHING APPARATUS

[76] Inventor: Mark D. Andrews, 1305 W. Whiteside, Springfield, Mo. 65807

[21] Appl. No.: 750,911

[22] Filed: Aug. 28, 1991

[51] Int. Cl.⁵ .............................................. G09B 21/02
[52] U.S. Cl. ..................................... 434/113; 434/112
[58] Field of Search ............... 434/113, 114, 115, 112; 340/407; 116/DIG. 17

[56] References Cited

U.S. PATENT DOCUMENTS

| | | | |
|---|---|---|---|
| 2,456,155 | 12/1948 | Seaman | 434/113 |
| 3,659,354 | 5/1972 | Sutherland | 434/113 |
| 4,191,945 | 3/1980 | Hannen et al. | 340/407 |
| 4,194,190 | 3/1980 | Bareau | 340/407 |
| 4,664,632 | 5/1987 | Tretiakoff et al. | 434/114 |
| 4,871,992 | 10/1989 | Petersen | 340/407 |
| 4,880,384 | 11/1989 | Murphy | 434/113 |

FOREIGN PATENT DOCUMENTS 0911592  3/1982  U.S.S.R. ............................. 434/112

Primary Examiner—John J. Wilson
Assistant Examiner—Jeffrey A. Smith
Attorney, Agent, or Firm—Chase & Yakimo

[57] ABSTRACT

A braille teaching device presents a planar base with opposed writing and reading surfaces. A plurality of cells in the base comprises an array of six bores corresponding to the location of potential embossed dots in the braille matrix. Dowels in each bore have writing and reading ends. To simulate the writing of a braille character selected dowels in each cell are plunged through the bores until the writing end of each dowel is positioned flush with the writing surface. Upon presenting the reading surface to the user, the user can read the previously written braille character by tactilely sensing the reading ends of each previously plunged dowel as displaced from the reading surface.

8 Claims, 2 Drawing Sheets

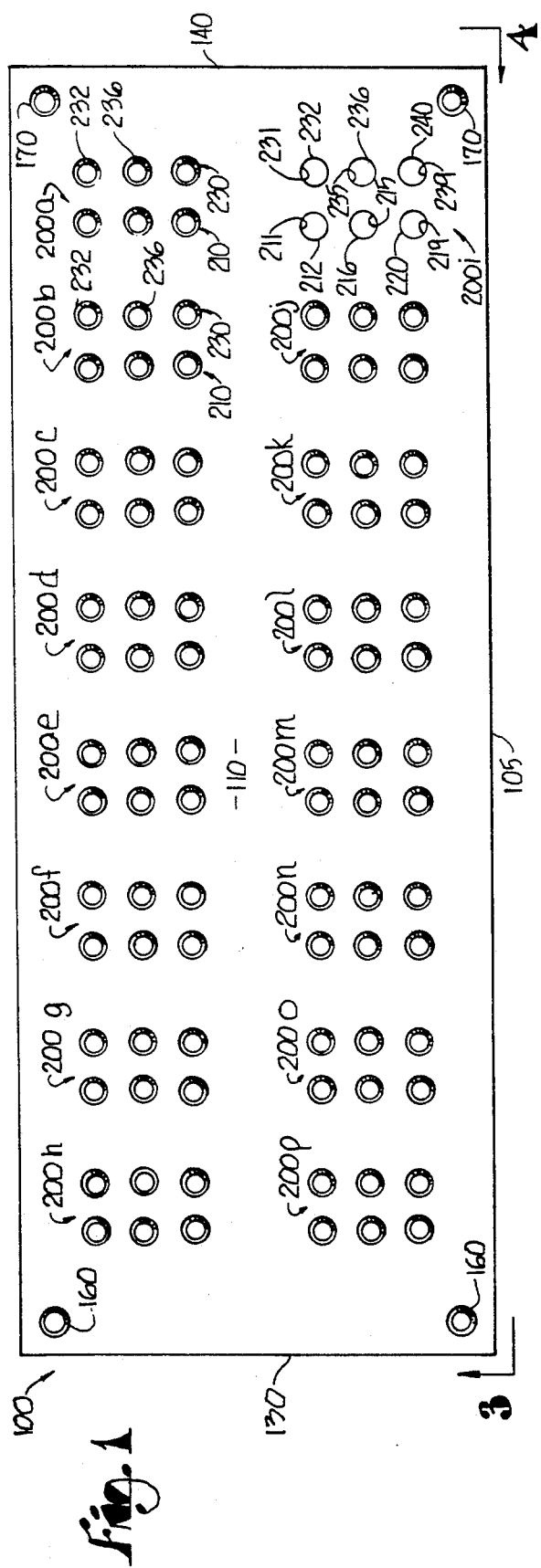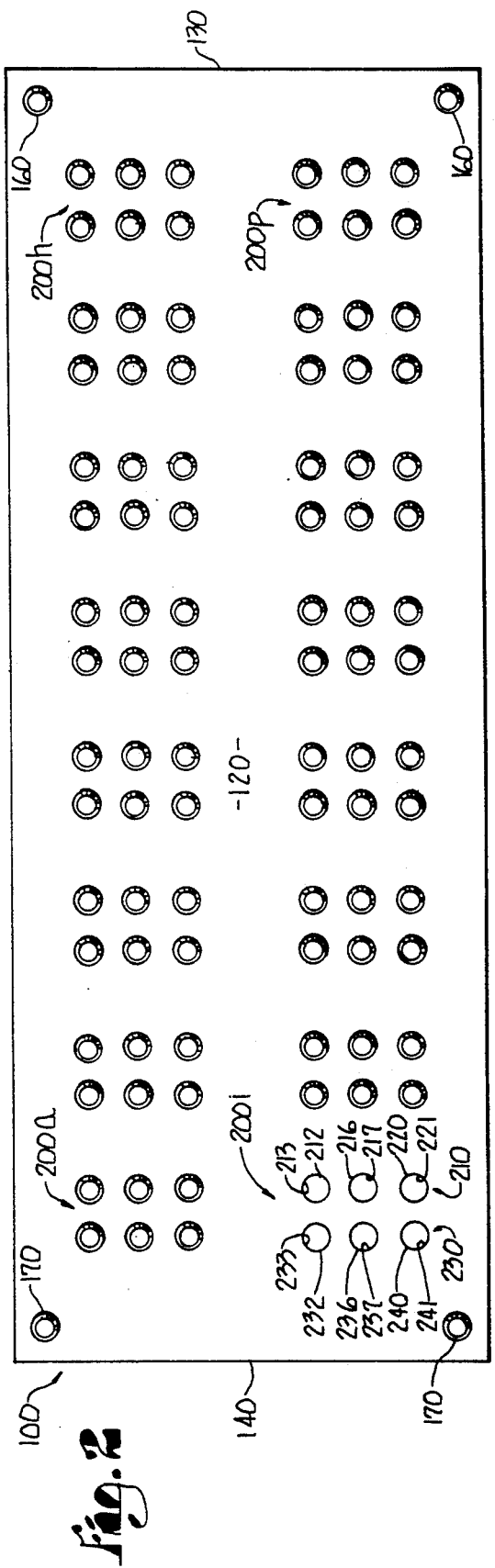

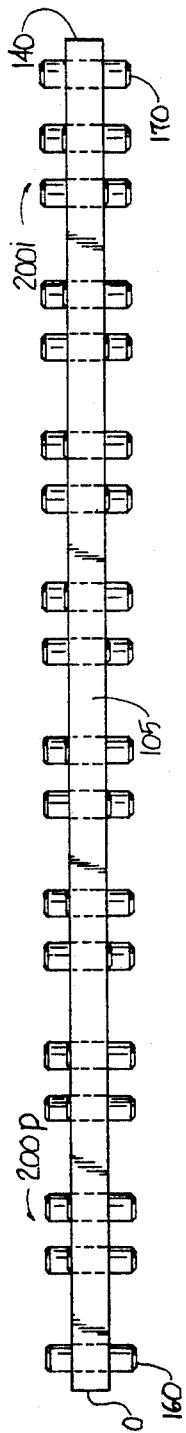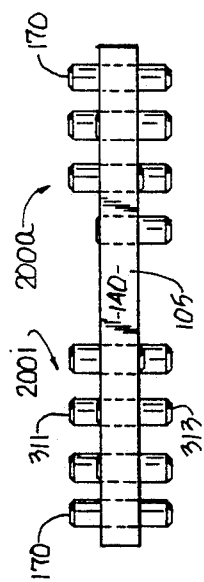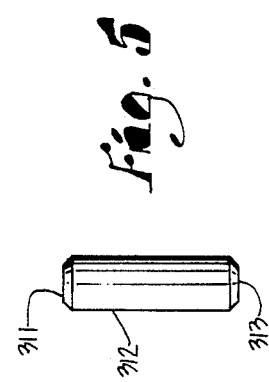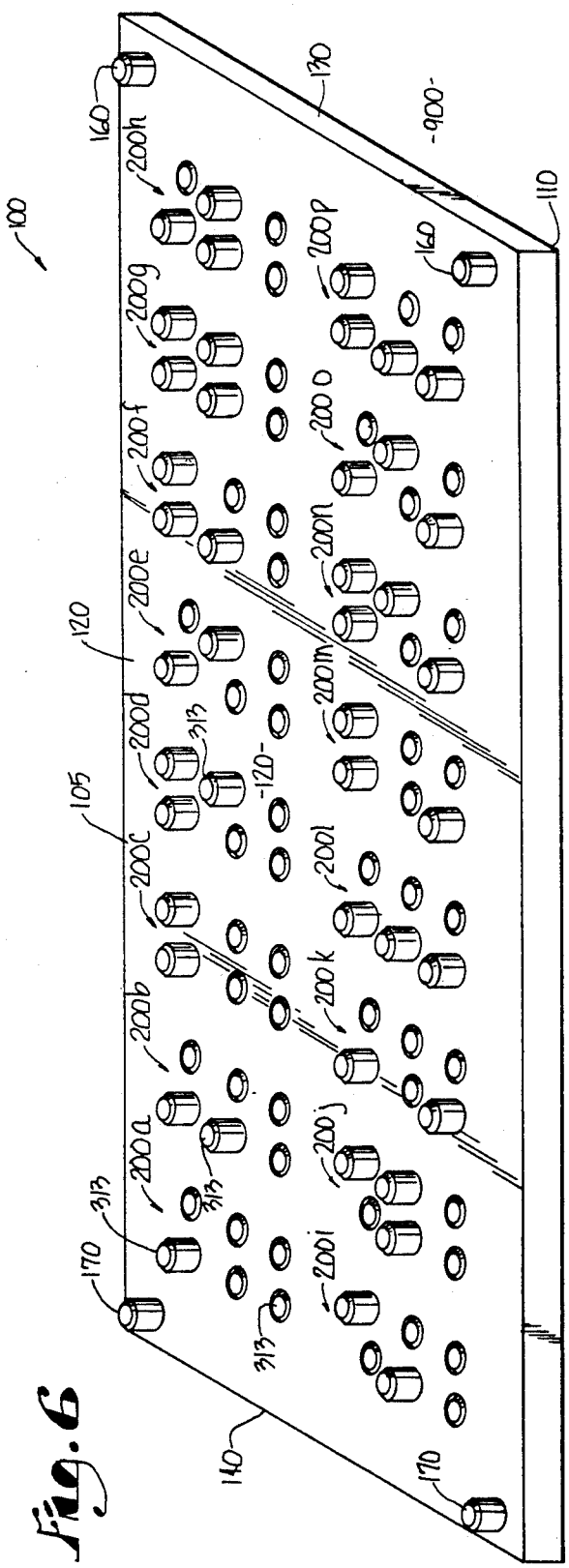

BRAILLE TEACHING APPARATUS

BACKGROUND OF THE INVENTION

This invention relates to a device for enhancing the teaching of the braille alphabet, and more particularly, to a device which allows user to simulate the writing of the braille characters and to immediately thereafter tactilely sense the written braille character.

When writing braille a stylus/slate assembly overlies the paper such that the writer makes indentations in the paper therebelow. Such indentations present an arrangement of raised/embossed dots on the paper. The pattern of such embossed dots in a six dot array corresponds to selected alphabetic, numeral and punctuation characters. As the user must turn the paper over for reading the embossed dots, the writer must write in braille from right to left. As such, each character to be designated by the basic braille matrix, which comprises two columns of three possible embossed dots, must be written from right to left. Thus, the writer must be able to recognize the braille characters in a mirror image so as to read and write the same.

Various devices in reading the braille characters have been relatively complex in construction. Such devices have not recognized the need to allow the user to write a braille character and then to immediately read such written character. It is also desirable during the teaching of braille, particularly in the writing thereof, to present the braille character to the user in an enlarged configuration. Such a configuration is desirable as the fingers of the untutored braille student are relatively insensitive to the nuances of the raised portions/embossed dots of the braille matrix. Thus it is desirable to magnify the braille characters so as to make the braille character readily apparent to the new user.

It is recognized in some circles that one cannot learn to read the braille alphabet before attempting to write the same. I believe that such construction can be accomplished by providing apparatus which readily combines the reading and writing instructional functions so as to concurrently learn the same.

I have invented a braille teaching device which allows a person to concurrently learn reading/writing of the braille alphabet. My device basically presents a planar base presenting opposed reading and writing surfaces. A plurality of braille matrices or cells are placed in rows along the base. Each cell includes an arrangement of six bores arranged in two columns of three bores so as to correspond to the "braille" matrix/cell. Each cell has a series of six pegs or dowels within the respective bores. To simulate writing a braille character the pegs are pushed to a position flush with the writing surface of the base corresponding to the embossed dots which represents in braille the character desired to be written. This action simulates the writing of braille, i.e. placing the embossed dots on the underlying paper. Upon completing the writing of the desired letter, numeral, etc. the user can then rotate the entire base 180 degrees about an imaginary horizontal axis so as to present the reading surface. The ends of the previously plunged dowels are now displaced from the reading surface similar to the embossed dots in the braille matrix. By tactilely sensing the raised ends the user reads the previously written character.

It is therefor a general object of this invention to provide a training device for concurrently teaching the reading and writing of braille.

Another object of this invention is to provide a device, as aforesaid, which presents the concurrent functions of reading and writing the braille alphabet so as to enhance the learning of the same.

Still another object of this invention is to provide a braille teaching device, as aforesaid, which magnifies the written portion of the braille characters so as to enhance the tactile sensing of the same.

Another object of this invention is to provide a braille teaching device, as aforesaid, which allows the user to write a series of braille characters and immediately thereafter read the same.

Other objects and advantages of this invention will become apparent from the following description take in connection with the accompanying drawings, wherein is set forth by way of illustration and example, a now preferred embodiment of this invention.

BRIEF DESCRIPTION OF THE DRAWINGS

FIG. 1 is a plan view of the planar base of the braille teaching apparatus with the writing surface being presented to the viewer;

FIG. 2 is a plan view of the opposed side of the planar base of the apparatus of FIG. 1 so as to present the reading surface to the user;

FIG. 3 is an elevation view of the apparatus of FIG. 1 along one longitudinal side thereof;

FIG. 4 is a side view of the apparatus of FIG. 1;

FIG. 5 is a view, on an enlarged scale, of one of the dowels utilized in the apparatus of FIG. 1;

FIG. 6 is a perspective view of the device of FIG. 1 in a reading position with the letters a-p being illustrated by the displaced reading ends of the dowels in each cell.

DESCRIPTION OF THE PREFERRED EMBODIMENT

Turning more particularly to the drawings, FIGS. 1-6 illustrate my new teaching device generally designated as 100. The device 100 generally comprises a planar base 105 presenting a planar writing surface 110 and an opposed reading surface 120. Located at the opposed lateral ends 130, 140 of base 105 are legs 160, 170 which displaces the base 105 from the underlying support surface 900 such as a table or the like.

Located in the base 105 are a plurality of cells 200 specifically designated as 200a, 200b, 200c, etc. according to the desired letter to be written and/or read therein. It is understood that each cell is identical in construction to cell 200a.

Each cell 200 is constructed to simulate a braille "cell" which forms the basis of the braille language. Dowels 312, as to be described, have been removed from cell 200i in FIGS. 1 and 2 so as to better show the bores and apertures therein. As such, each cell 200 comprises first 210 and second 230 columns of three vertical bores 212, 216, 220 and 232, 236, 240. Each bore vertically extends through the base 105 and presents opposed apertures 211, 215, 219, 231, 235, 239 on the respective writing 110 surface as well as apertures 233, 237, 241, 213, 217, 221 on the reading surface 120.

Positioned in each bore is a dowel 312 (FIG. 5) configured to slidably fit in its respective bore. Each dowel 312 may be slightly tapered at its opposed ends 311, 313 to enhance the user manipulation thereof.

In use the respective dowel writing ends 311 are first displaced from the writing surface 110. As such, the opposed reading ends 313 of each dowel are generally flush with the underlying reading surface 120. Legs 160, 170 preferably raise base 105 from the underlying support surface 900 to allow for the subsequent plunging of the dowel writing ends 311 to a flush position.

As above discussed, upon writing the braille language on paper, the braille array of dots of each character must be written from right to left so that the resulting braille array of embossed dots will properly appear on the underlying paper when said paper is turned over for reading the braille characters from left to right. Thus, upon presenting the writing surface 110 to the user, selectable dowels 312 in each cell 200, corresponding to the desired embossed dot arrays, are depressed until the writing end 311 is flush with the writing surface 110. This action corresponds to the action of writing braille, i.e. making an indentation with a stylus in the underlying paper so as to raise an embossed dot on the other side thereof. Thus for example, in cell 200a, to write the letter "a" the dowel in column 230, bore 232 is depressed while the other dowels 312 remain in their upright position. As such the action of writing the letter "a" in braille is simulated by plunging the dowel 312 through bore 232 as there is only one embossed dot to be raised in the underlying paper and such dot is in the upper right hand corner when written. This action is repeated in each cell. In cell 200b the letter "b" is to be written. Thus, the dowels 312 in column 2 (230), rows 1 and 2, i.e. bores 232, 236, are depressed while the other dowels 312 remain in their upright position. Each letter of the alphabet has been so written according to the letter designating each cell, i.e. "c" in 200c, "d" in 200d and so on.

Upon completion of the writing exercise, the written characters can be checked or "read" by the user upon rotating the device 100 180 degrees about lateral edge 130 such that the lateral edge 140 is now presented to the left side of the user. Upon such rotation as shown in FIG. 2 and FIG. 6, the displaced reading end 313 of each previously plunged dowel 312 is presented to the user as a raised end relative to the reading surface 120. Those dowels 312 which were not involved in the previous writing exercise now present their reading ends 313 at a position generally flush to the reading surface 120. Thus, the user can tactilely sense the displaced reading ends 313 of the plurality of dowels in each cell 200 so as to "read" the previously written braille character. Such a reading exercise is possible because, as shown in FIG. 6, the displaced reading ends 313 of each dowel 312 are in the same array configuration as the embossed dots of the corresponding braille alphabet. As such, letters a-h are presented in a braille array in row 1 with letters i-p presented in a braille array in row 2.

Upon checking the results thereof the user can then depress all the dowels and rotate the board to its FIG. 1 position so as to present all the dowels 312 in a raised position relative to the writing surface 110. The user can then start at the cell 200a at the upper right hand corner and then perform a subsequent writing exercise along cells 200a-200h and then cells 200i-200p as previously described. Such exercises can simulate the writing of desired words, letters, numerals and other braille indicia.

It is herein noted that the size of the dowel ends 311, 313 are many times magnified relative to the normal size of the braille embossed dots. The magnification is helpful for the novice student and is believed to enhance the braille instruction. It is herein noted that alternate dowels having reduced writing and reading ends may be subsequently utilized so as to diminish the magnification of the braille array presented to the student. Such reduction can occur as the expertise of the student increases. Thus, dowels having the ends successively reduced may be used so as to successively approach the normal size of the embossed dots of the braille array.

It is also noted that the size of the above-described braille cells and the spacing of the bores therein may approach the size and spacing of the normal braille cell. Such a braille cell would necessarily utilize dowels having ends the size of the normal embossed dots of the braille array.

Although one form of this invention has herein been illustrated and described it is understood that it should not be limited thereto except as set forth in the following claims and allowable functional equivalent thereof.

Having thus described the invention, what is claimed as new and desired to be secured by Letters Patent is:

1. A braille teaching device comprising:
   a generally planar base comprising a first planar writing surface and a second opposed planar reading surface, said reading surface underlying said writing surface upon a user manipulation of said writing surface to a generally horizontal position relative to the user;
   a plurality of cells in said base with each cell comprising:
      a plurality of six bores arranged in two columns of three bores extending through each base, each bore terminating in opposed apertures on said opposed reading and writing surfaces;
   a dowel in each bore having a length greater than a distance between said two opposed surfaces, said dowels presenting a free first writing end and an opposed free second reading end, each dowel slidable by a user through each bore between a first position wherein said writing end is displaced from said writing surface to a second position wherein said writing end is generally flush with said writing surface, whereupon a predetermined number of said writing ends of said dowels in each cell is moved by the user from said first position displaced from said writing surface to said second position generally flush with said writing surface, said movement corresponding to writing a selected braille character;
   said reading end of each dowel in said second position extending beyond said reading surface, whereupon a user manipulation of said reading surface of said base to a position facing the user presents a plurality of reading ends displaced from said reading surface to allow the user to read said previously written braille character by tactilely sensing said reading ends of each dowel displaced from said reading surface.

2. The apparatus as claimed in claim 1 further comprising:
   a plurality of legs extending through said base, said legs raising said base from an underlying support surface at a distance to allow said dowels to be displaced to said flush position without interference of the underlying support surface.

3. The apparatus as claimed in claim 1 wherein said base is generally rectangular in configuration, said plurality of cells positioned along said base in at least one row of cells thereon.

4. The apparatus as claimed in claim 1 wherein said reading ends of each dowel correspond to an embossed dot of a braille matrix, said combination of embossed dots in said matrix representing said braille character.

5. The apparatus as claimed in claim 4 wherein said ends of said dowels are of a reduced configuration relative to the configuration of the bore and the portion of the dowel therein, said reading ends being relatively larger than the normal embossed dots of the normal braille matrix, whereby to enhance said tactile sensing of said reading ends of said dowels.

6. The apparatus as claimed in claim 5 wherein said dowels of said device are releasable from said bore, said releasable dowels allowing for insertion of said dowels with a subsequent set of releasable dowels in said bores, said subsequent dowels presenting relatively smaller reading ends to the user, whereby the reading ends of each dowel of said subsequent set of dowels approach the configuration of the normal embossed dots of the normal braille matrix.

7. The apparatus as claimed in claim 1 wherein said planar base is rotated after said writing of said selected braille characters, said rotation presenting said reading surface to the user with said reading ends displaced therefrom.

8. A braille teaching device comprising:
a generally planar base having a first writing surface facing towards a user and a second opposed reading surface facing away from the user;
at least one cell in said base, said cell comprising:
  a plurality of six bores arranged in said base to correspond to the possible positions of embossed dots of a braille matrix;
  a dowel slidably seated in each bore having a first writing end and an opposed second reading end, each of said plurality of dowels having a configuration relative to the bore for slidable movement therethrough by a user with each end of each dowel presenting a configuration relatively smaller than the configuration of the dowel portion sliding through said bore, the user urging the writing end of each selected dowel of a corresponding bore from a first position to a second position wherein said writing end is generally flush with said writing surface, whereupon said writing end movement extends said reading end beyond said reading surface and simulates a writing of an embossed dot of a selected braille character in the braille matrix;
  said reading end of each flush dowel extending beyond said reading surface and corresponding to a written embossed dot of the braille matrix upon user rotation of the reading surface to a position facing the user, whereby the user reads said previously written braille character by tactilely sensing the array of reading ends of each flush dowel as displaced beyond each reading surface.

* * * * *